US010530780B2

(12) United States Patent
Henry et al.

(10) Patent No.: US 10,530,780 B2
(45) Date of Patent: Jan. 7, 2020

(54) ENTITY VALIDATION FOR RESOURCE DISTRIBUTION LOCATION

(71) Applicant: BANK OF AMERICA CORPORATION, Charlotte, NC (US)

(72) Inventors: Dean Lyons Henry, Charlotte, NC (US); Huihui Wu, Long Island, NY (US); Alfred James Reed, Huntersville, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 171 days.

(21) Appl. No.: 15/730,568

(22) Filed: Oct. 11, 2017

(65) Prior Publication Data

US 2019/0109853 A1 Apr. 11, 2019

(51) Int. Cl.
*G06F 15/16* (2006.01)
*H04L 29/06* (2006.01)
*G06F 21/31* (2013.01)
*G06F 21/44* (2013.01)

(52) U.S. Cl.
CPC ............ *H04L 63/104* (2013.01); *G06F 21/31* (2013.01); *G06F 21/44* (2013.01); *H04L 63/102* (2013.01); *H04L 63/101* (2013.01)

(58) Field of Classification Search
CPC ... H04L 63/102; H04L 63/104; H04L 63/105; H04L 63/107; H04L 67/1097; G06F 9/50
See application file for complete search history.

(56) References Cited

U.S. PATENT DOCUMENTS

| | | |
|---|---|---|
| 5,963,924 A | 10/1999 | Williams et al. |
| 6,016,484 A | 1/2000 | Williams et al. |
| 6,401,079 B1 | 6/2002 | Kahn et al. |
| 6,721,783 B1 | 4/2004 | Blossman et al. |
| 6,752,313 B1 | 6/2004 | Caviles et al. |
| 7,032,031 B2 | 4/2006 | Jungck et al. |
| 7,110,969 B1 | 9/2006 | Bennett et al. |
| 7,114,008 B2 | 9/2006 | Jungck et al. |
| 7,440,915 B1 | 10/2008 | Ulrich |
| 7,676,431 B2 | 3/2010 | OLeary et al. |
| 7,680,735 B1 | 3/2010 | Loy |
| 7,680,737 B2 | 3/2010 | Smith, Jr. et al. |
| 7,693,783 B2 | 4/2010 | Balasubramanian et al. |
| 7,801,814 B2 | 9/2010 | Cataline et al. |
| 7,822,656 B2 | 10/2010 | Knight et al. |

(Continued)

*Primary Examiner* — Yves D Dalencourt
(74) *Attorney, Agent, or Firm* — Michael A. Springs; Moore & Van Allen PLLC; Jeffrey R. Gray

(57) ABSTRACT

Provide improved validation of a recipient entity when the recipient entity is involved in an interaction with a provider entity. One or more application programming interfaces (APIs) are provided that are utilized to validate the recipient entity. Recipient entity information, such as a recipient entity identifier, is utilized and communicated to the resource systems to more efficiently validate the recipient entity in order to improve the processing capacity, reduce memory requirements, and improve processing speeds for validating the recipient entity for an interaction. Moreover, a more accurate determination of the actual identity of the recipient entity may be provided, thus improving the security of the interaction between the entities and reducing the potential for misappropriation of the resources involved in the interactions.

16 Claims, 5 Drawing Sheets

(56) References Cited

U.S. PATENT DOCUMENTS

| | | |
|---|---|---|
| 7,822,688 B2 | 10/2010 | Labrou et al. |
| 8,001,025 B2 | 8/2011 | Vadhri |
| 8,005,754 B2 | 8/2011 | McCoy et al. |
| 8,010,424 B1 | 8/2011 | Hamilton et al. |
| 8,121,945 B2 | 2/2012 | Rackley, III et al. |
| 8,140,429 B2 | 3/2012 | Balasubramanian et al. |
| 8,254,658 B2 | 8/2012 | Hamilton |
| 8,255,324 B2 | 8/2012 | Bercy et al. |
| 8,285,641 B2 | 10/2012 | Cataline et al. |
| 8,290,862 B2 | 10/2012 | Sheehan et al. |
| 8,328,095 B2 | 12/2012 | Oder, II et al. |
| 8,407,140 B2 | 3/2013 | Ayala et al. |
| 8,438,086 B2 | 5/2013 | Rosko et al. |
| 8,458,070 B2 | 6/2013 | Rosko et al. |
| 8,473,324 B2 | 6/2013 | Alvarez et al. |
| 8,645,266 B2 | 2/2014 | Balasubramanian et al. |
| 8,650,118 B2 | 2/2014 | Balasubramanian et al. |
| 8,875,990 B2 | 11/2014 | Bishop et al. |
| 8,924,294 B2 | 12/2014 | Lynch et al. |
| 9,215,231 B1 * | 12/2015 | Bowen ............... H04L 63/1416 |
| 9,367,753 B2 | 6/2016 | Li et al. |
| 9,495,680 B2 | 11/2016 | Oder, II et al. |
| 9,691,278 B2 | 6/2017 | Poomachandran et al. |
| 9,779,392 B1 | 10/2017 | Prasad et al. |
| 9,959,531 B2 | 5/2018 | Purves et al. |
| 10,154,084 B2 | 12/2018 | Kalgi |
| 10,157,436 B2 | 12/2018 | Samocha et al. |
| 2003/0099237 A1 | 5/2003 | Mitra et al. |
| 2004/0148252 A1 | 7/2004 | Fleishman |
| 2005/0065678 A1 | 3/2005 | Smith et al. |
| 2006/0161604 A1 | 7/2006 | Lobo |
| 2006/0206425 A1 | 9/2006 | Sharma |
| 2009/0262741 A1 | 10/2009 | Jungck et al. |
| 2010/0103837 A1 | 4/2010 | Jungck et al. |
| 2010/0280909 A1 | 11/2010 | Zhang et al. |
| 2011/0055077 A1 | 3/2011 | French et al. |
| 2011/0270733 A1 | 11/2011 | Chazen |
| 2012/0233066 A1 | 9/2012 | Vallabhaneni |
| 2012/0259777 A1 | 10/2012 | Rosko et al. |
| 2013/0110709 A1 | 5/2013 | Hodge et al. |
| 2013/0163746 A1 | 6/2013 | Wick et al. |
| 2013/0173437 A1 | 7/2013 | Capparell et al. |
| 2013/0208879 A1 | 8/2013 | Rosenhaft et al. |
| 2013/0346302 A1 | 12/2013 | Purves et al. |
| 2014/0201070 A1 | 7/2014 | Liberty |
| 2014/0214649 A1 | 7/2014 | DuCharme et al. |
| 2014/0244500 A1 | 8/2014 | Elias |
| 2014/0279404 A1 | 9/2014 | Kallimani et al. |
| 2014/0297520 A1 | 10/2014 | Levchin et al. |
| 2014/0372751 A1 | 12/2014 | Silverstone |
| 2015/0032605 A1 | 1/2015 | Williams et al. |
| 2016/0055583 A1 | 2/2016 | Liberty et al. |
| 2016/0086184 A1 | 3/2016 | Carpenter et al. |
| 2016/0110721 A1 | 4/2016 | Russell et al. |
| 2016/0232518 A1 | 8/2016 | Butler |
| 2016/0247037 A1 | 8/2016 | Li et al. |
| 2016/0253639 A1 | 9/2016 | Sharma |
| 2016/0328711 A1 | 11/2016 | Elischer |
| 2016/0379192 A1 | 12/2016 | Purves et al. |
| 2017/0032352 A1 | 2/2017 | Koeppen et al. |
| 2017/0091791 A1 | 3/2017 | Srinivasan et al. |
| 2017/0091873 A1 | 3/2017 | Cole et al. |
| 2017/0109717 A1 | 4/2017 | Vafeas |
| 2017/0134479 A1 * | 5/2017 | Kalgi ................... G06F 16/958 |
| 2017/0169420 A1 | 6/2017 | Setlur et al. |
| 2017/0178110 A1 | 6/2017 | Swanson et al. |
| 2017/0178126 A1 | 6/2017 | Liu et al. |
| 2018/0129945 A1 | 5/2018 | Saxena et al. |
| 2018/0129952 A1 | 5/2018 | Saxena et al. |
| 2018/0129953 A1 | 5/2018 | Saxena et al. |
| 2018/0129954 A1 | 5/2018 | Saxena et al. |
| 2018/0129955 A1 | 5/2018 | Saxena et al. |
| 2018/0129956 A1 | 5/2018 | Saxena et al. |
| 2018/0129957 A1 | 5/2018 | Saxena et al. |
| 2018/0129958 A1 | 5/2018 | Saxena et al. |
| 2018/0143975 A1 | 5/2018 | Casal et al. |
| 2018/0165416 A1 | 6/2018 | Saxena et al. |
| 2018/0165585 A1 | 6/2018 | Saxena et al. |
| 2018/0165586 A1 | 6/2018 | Saxena et al. |
| 2018/0165588 A1 | 6/2018 | Saxena et al. |
| 2018/0165598 A1 | 6/2018 | Saxena et al. |
| 2018/0165611 A1 | 6/2018 | Saxena et al. |
| 2018/0165612 A1 | 6/2018 | Saxena et al. |
| 2018/0165758 A1 | 6/2018 | Saxena et al. |
| 2018/0189756 A1 | 7/2018 | Purves et al. |
| 2018/0247544 A1 | 8/2018 | Mustafic et al. |
| 2019/0012646 A1 | 1/2019 | Seidl et al. |
| 2019/0057378 A1 | 2/2019 | Rudnick et al. |
| 2019/0075156 A1 | 3/2019 | Kalgi |

* cited by examiner

ENTITY VALIDATION FOR RESOURCE DISTRIBUTION LOCATION

FIELD

The present invention relates to validation of an entity associated with a resource pool, and more particularly to improving the processing capability, memory, and processing speed of the systems that validate an entity associated with a digital resource pool.

BACKGROUND

Validation of an entity typically includes validating the entity each time an interaction is entered into between different entities. That is, each time an interaction occurs validation interactions occur before the interaction between the entities can occur. These validation interactions reduce the processing capacity, increase memory requirements, and reduce the processing speed needed to validate each interaction between various entities. Improved systems, processes, and computer program products are needed to increase the capacity, reduce memory requirements, and increase the processing speed associated with interactions between entities.

SUMMARY

The following presents a simplified summary of one or more embodiments of the present invention, in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

Generally, systems, computer products, and methods are described herein that provide for improved validation of a recipient entity (e.g., a business, an individual user, or the like) when the recipient entity is involved in an interaction with a provider entity. The present invention provides one or more application programming interfaces (APIs) that are utilized to validate the recipient entity. The present invention further utilizes recipient entity information (e.g., a recipient entity identifier, and/or other entity information), and communicates the entity information to the resource systems to more efficiently validate the recipient entity in order to improve the processing capacity, reduce memory requirements, and improve processing speeds for validating the recipient entity for an interaction. Moreover, the present invention provides a more accurate determination of the actual identity of the recipient entity, thus improving the security of the interaction between the entities and reducing the potential for misappropriation of the resources involved in the interactions. The present invention solves at least the technical problems of improving the capacity, memory, and processing speed of the validation systems and improving the ability to identify the identity of the recipient entity.

Additionally, systems, computer products, and methods are also described herein that provide for improving the delivery of resources to a recipient entity (e.g., a business, an individual user, or the like) when the recipient entity is involved in an interaction with a provider entity. The present invention provides one or more application programming interfaces (APIs) that are utilized to identify delivery channels, and potentially substitute an original delivery channel with an alternate delivery channel that is preferred by the recipient entity. The present invention utilizes entity information (e.g., a recipient entity identifier, and/or other entity information), which will be described in further detail later, in order to determine recipient entity delivery preferences from a stored preference or from communications with the recipient entity. After the delivery preferences are determined, the system provides the resources to the recipient entity according to the preferences identified. The present invention provides a more efficient delivery of resources to the recipient entity improving the capacity, memory, and processing speed of the delivery systems and improving the ability to identify the identity of the recipient entity before the resources are delivered to the recipient entity.

Embodiments of the invention comprise systems, methods, and computer program products for validating entities for interactions. A request is received from a provider entity through one or more application programming interfaces (APIs) for an interaction with a recipient entity. The interaction with the recipient entity includes at least delivering resources to a resource pool of the recipient entity. The request includes recipient entity information comprising at least a recipient entity identifier. The request is received through a provider entity computer system. After the request is received, the recipient entity is validated using the recipient entity information, including at least the recipient entity identifier. The resources are then delivered to the resource pool of the recipient entity when the recipient entity is validated. The resources are delivered by communicating with a resource system.

In further accord with embodiments of the invention, validating the recipient entity comprises communicating at least the recipient entity identifier to the resource system. A validation response is then received from the resource system. The validation response comprises a validation confirmation that the recipient entity is validated when the resource pool of the recipient entity is identified within the resource system. Alternatively, the validation response comprises an indication of multiple resource pools when two or more recipient entities or two or more resource pools for the recipient entity are identified.

In other embodiments of the invention, in response to receiving the validation confirmation, the resources are delivered to the resource pool of the recipient entity. In response to receiving the indication of multiple resource pools an information request is sent to the provider entity or the recipient entity. The information request comprises a request for a selection of one of the multiple resource pools to deliver the resources, and the information request is sent to the provider entity computer system or a recipient entity computer system.

In still other embodiments of the invention, validating the recipient entity comprises accessing a validation database, wherein the validation database comprises stored validations for a plurality of recipient entities comprising stored recipient entity information. The recipient entity information is compared with the stored recipient entity information. The recipient entity is validated when the recipient entity information meets the stored recipient entity information. The recipient entity information is communicated to the resource system when the recipient entity information does not meet the stored recipient entity information.

In yet other embodiments of the invention, validating the recipient entity comprises determining that the recipient entity information meets one or more validation conditions, wherein the one or more validation conditions comprise at least one validation of the recipient entity within a past time period.

In further accord with embodiments of the invention, the validation database is stored by a third-party system.

In other embodiments of the invention, validating the recipient entity comprises pinging the resource system to determine existence of the resource pool for the recipient entity identifier without having to utilize resource validation interactions.

In still other embodiments of the invention, the recipient entity identifier comprises an electronic communication address or a mobile device number of the recipient entity, and the validation occurs without utilizing a resource pool number of the recipient entity.

In yet other embodiments of the invention, the recipient entity information further comprises a resource pool entity of the recipient entity, wherein the resource pool entity comprises a holder of a digital wallet of the recipient entity.

In further accord with embodiments of the invention, the recipient entity information further comprise a name of the recipient entity.

In other embodiments of the invention, the provider entity receives the recipient entity information from the recipient entity when entering the interaction with the recipient entity.

To the accomplishment the foregoing and the related ends, the one or more embodiments comprise the features hereinafter described and particularly pointed out in the claims. The following description and the annexed drawings set forth certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Figure 1:
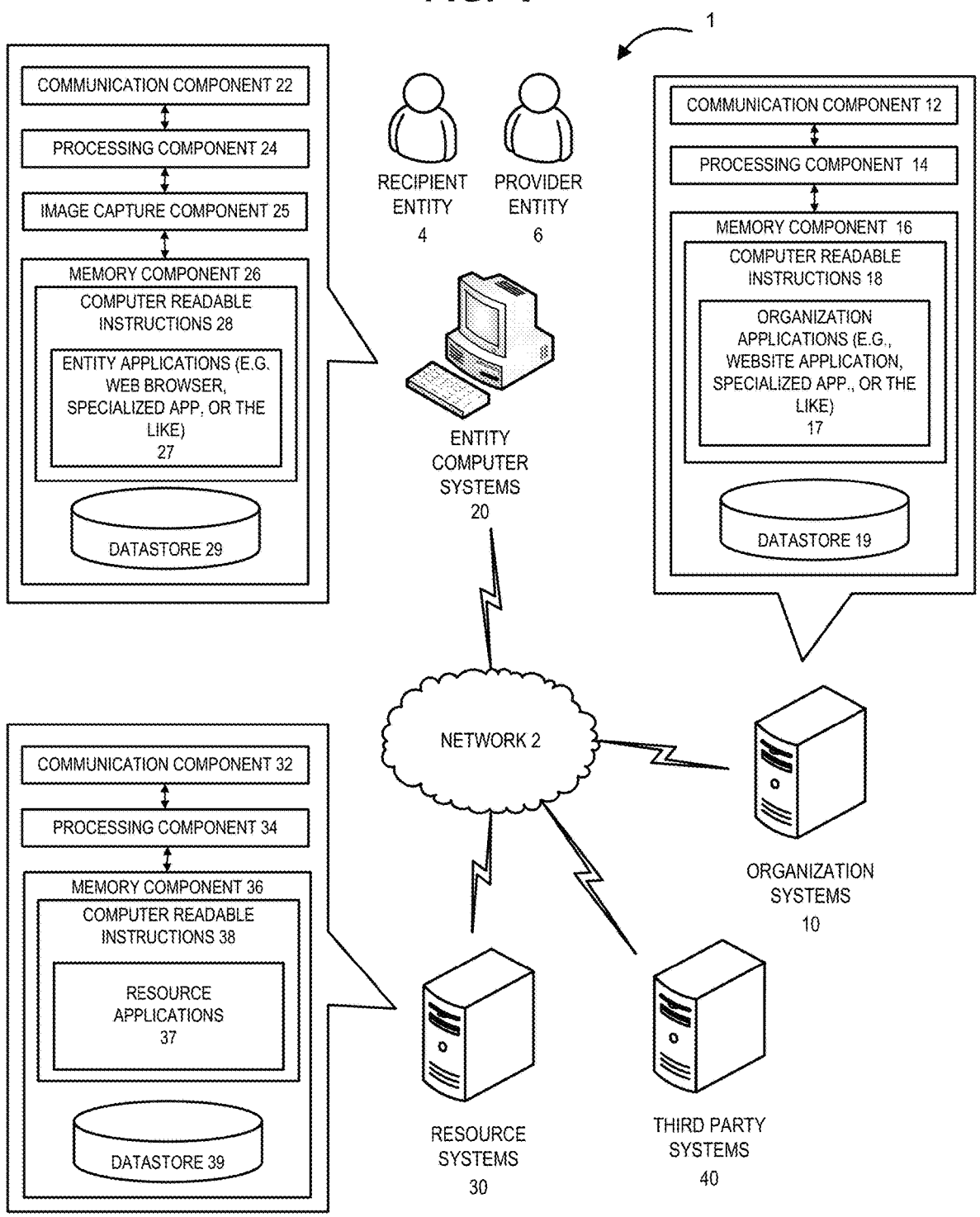

Having thus described embodiments of the invention in general terms, reference will now be made to the accompanying drawings, and wherein:

FIG. 1 illustrates a block diagram of a validation and/or delivery channel system, in accordance with embodiments of the invention.

Figure 2:
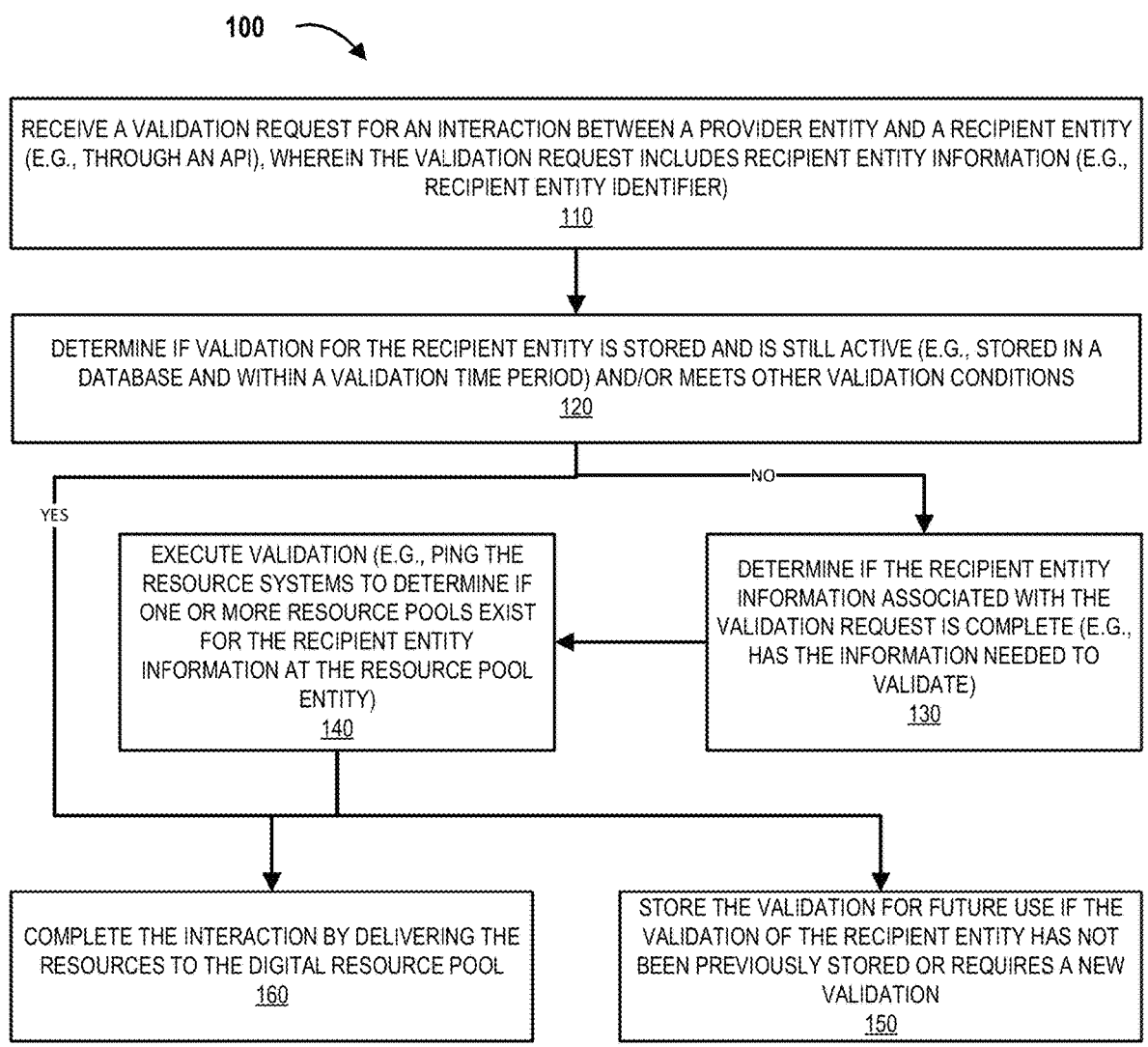

FIG. 2 illustrates a validation process, in accordance with embodiments of the invention.

Figure 3:
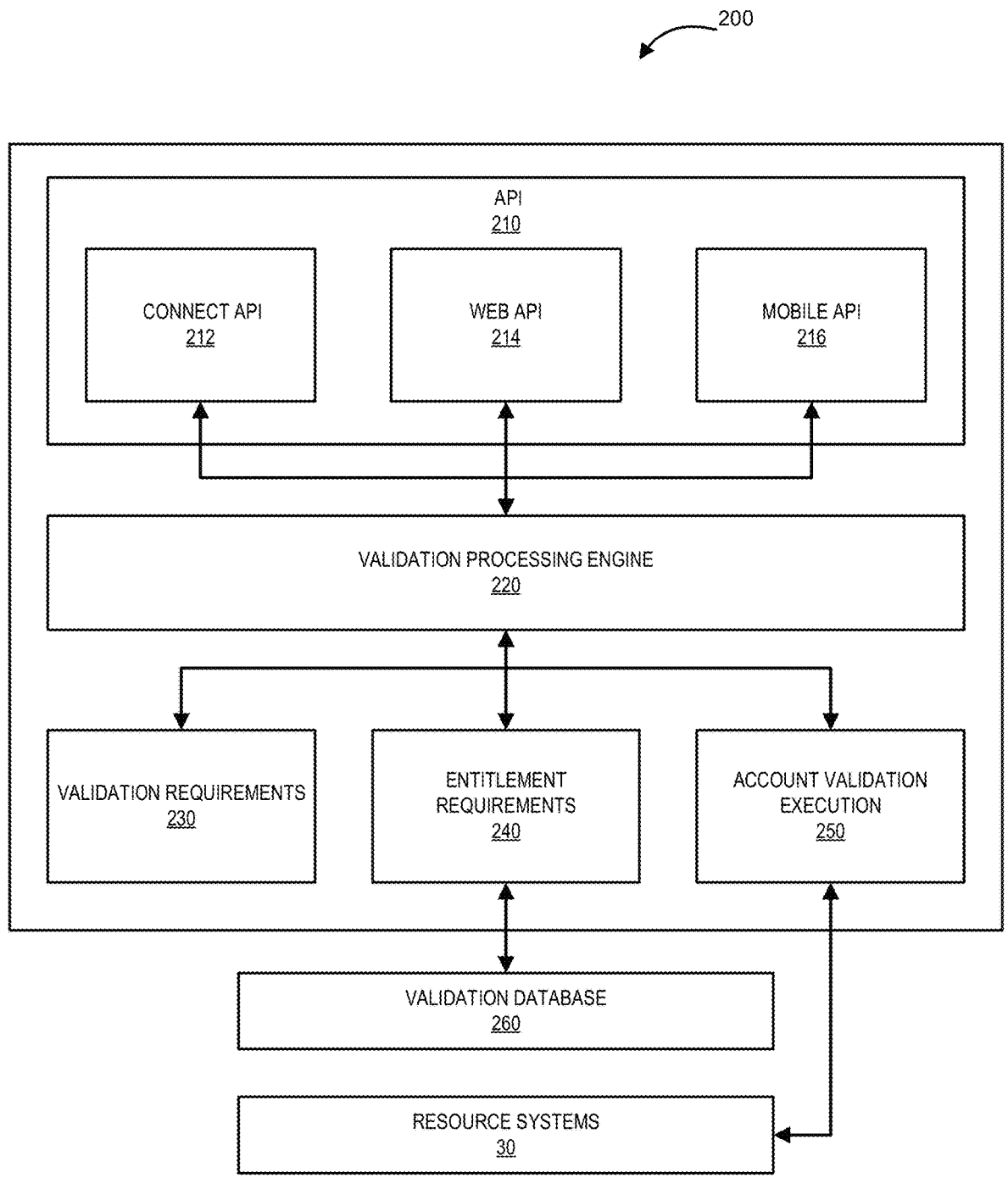

FIG. 3 illustrates a validation block diagram, in accordance with embodiments of the invention.

Figure 4:
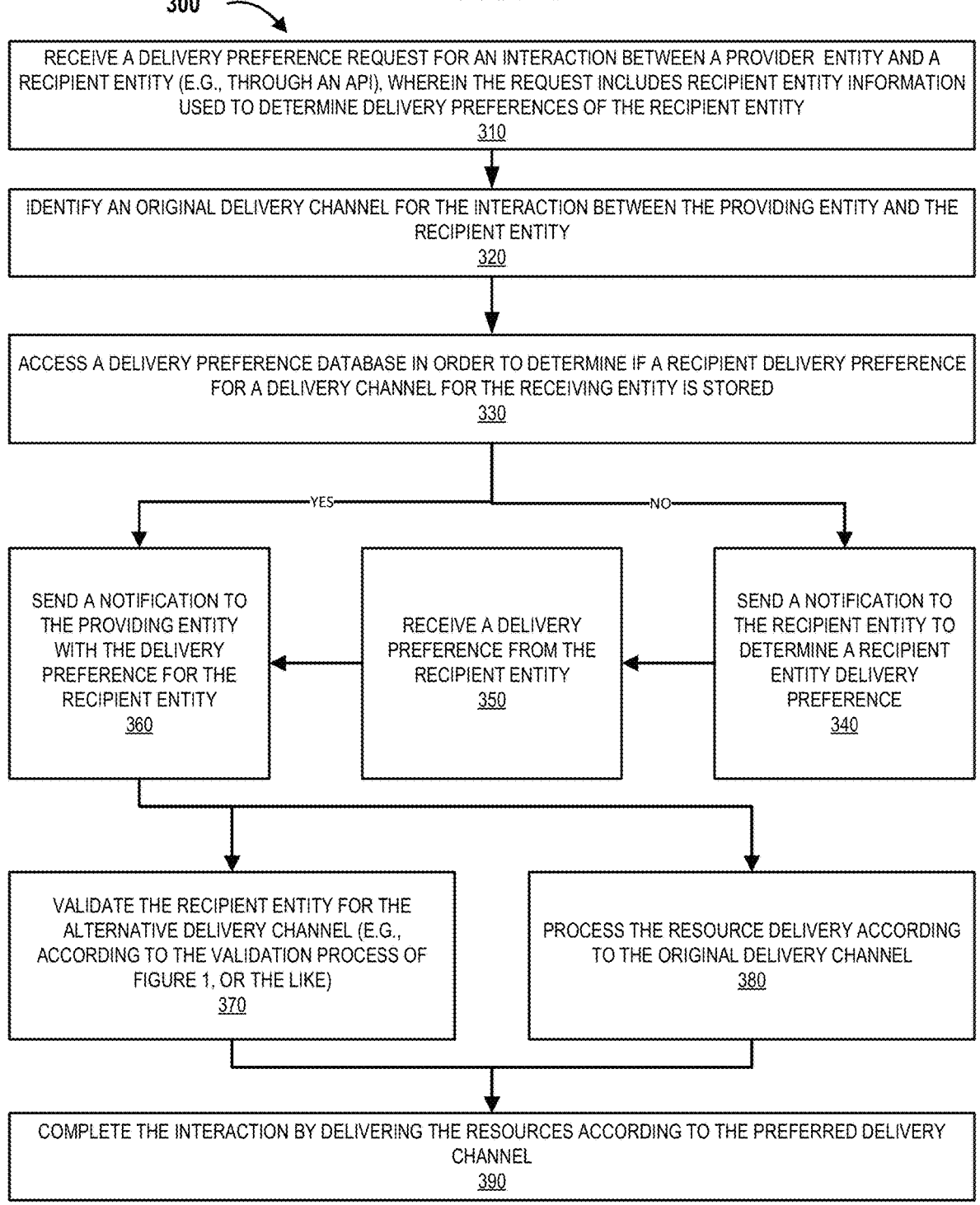

FIG. 4 illustrates a delivery process, in accordance with embodiments of the invention.

Figure 5:
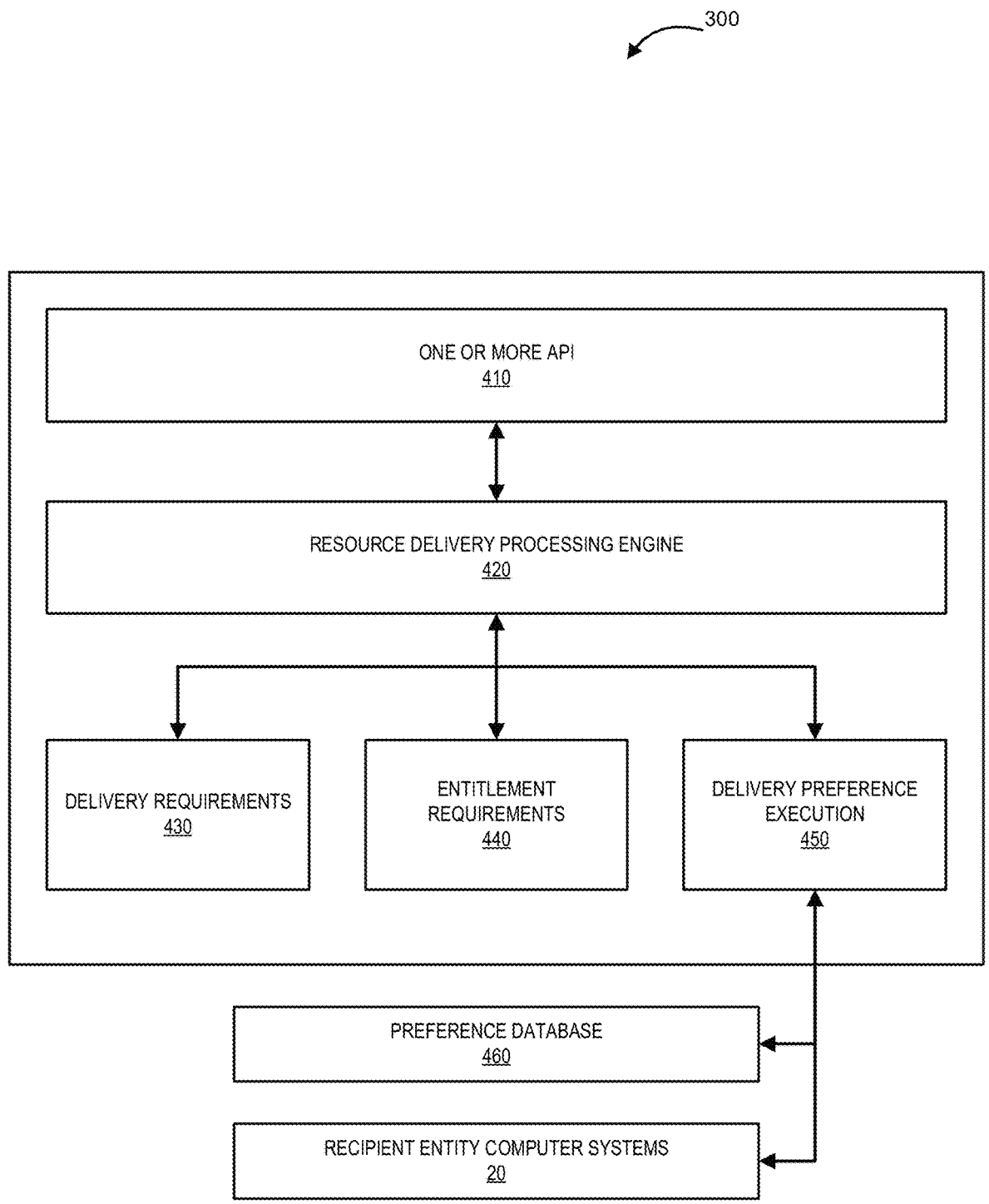

FIG. 5 illustrates a delivery block diagram, in accordance with embodiments of the invention.

DETAILED DESCRIPTION OF EMBODIMENTS OF THE INVENTION

Embodiments of the invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. In the following description, for purposes of explanation, numerous specific details are set forth in order to provide a thorough understanding of one or more embodiments. It may be evident; however, that such embodiment(s) may be practiced without these specific details. Like numbers refer to like elements throughout.

Systems, methods, and computer program products are herein disclosed that provide for improving the validation of a recipient entity (e.g., a business, an individual user, or the like) when the recipient entity is involved in an interaction with a provider entity. The present invention provides one or more application programming interfaces (APIs) that are utilized to validate the recipient entity. The present invention further utilizes recipient entity information (e.g., a recipient entity identifier, and/or other entity information), which will be described in further detail later, and communicates the entity information to the resource systems to more efficiently validate the recipient entity and/or the recipient entity's resource pool in order to improve the processing capacity, reduce memory requirements, and improve processing speeds for validating the recipient entity for an interaction. Moreover, the present invention provides a more accurate determination of the actual identity of the recipient entity, thus improving the security of the interaction between the entities and reducing the potential for misappropriation of the resources involved in the interactions. The present invention solves at least the technical problems of improving the capacity, memory, and processing speed of the validation systems and improving the ability to identify the identity of the recipient entity and/or the associated resource pool.

Systems, methods, and computer program products are herein further disclosed that provide for improving the delivery of resources to a recipient entity (e.g., a business, an individual user, or the like) when the recipient entity is involved in an interaction with a provider entity. The present invention provides one or more application programming interfaces (APIs) that are utilized to identify delivery channels, and potentially substitute an original delivery channel with an alternate delivery channel that is preferred by the recipient entity. The present invention utilizes entity information (e.g., a recipient entity identifier, and/or other entity information), which will be described in further detail later, in order to determine recipient entity delivery preferences from a stored preference or from communications with the recipient entity. After the delivery preferences are determine, the system provides the resources to the recipient entity according to the preferences identified. The present invention provides a more efficient delivery of resources to the recipient entity improving the capacity, memory, and processing speed of the delivery systems and improving the ability to identify the identity of the recipient entity and/or the associated resource pool before the resources are delivered to the recipient entity.

FIG. 1 illustrates an entity validation and/or resource delivery system 1, in accordance with embodiments of the invention. As illustrated in FIG. 1, one or more organization systems 10 are operatively coupled, via a network 2, to one or more entity computer systems 20, one or more digital resource systems 30, one or more third-party systems 40, and/or one or more other systems (not illustrated). In this way, a provider entity 6 may enter into an interaction with a recipient entity 4, verify the recipient entity 4 as the proper entity, and determine resource delivery preferences in order to provide resources to the recipient entity 4. It should be understood that the entities may be users entering interactions with each other, businesses entering interactions with each other, or businesses entering interactions with users. It should be further understood that the entities may, or may be represented by, one or more associates, employees, agents, contractors, sub-contractors, third-party representatives, customers, or the like. As such, in one embodiment of the invention a provider entity 6 that is a customer of the organization may enter into an interaction with a recipient entity 4, in which the recipient entity 4 is validated in order to deliver resources of the provider entity 6 that are held by an organization within the organization systems 10 to the recipient entity 4 based on the delivery preferences of the recipient entity, such as delivering the resources to one or more resource systems 30 at which the recipient entity 4 has a resource pool.

The organization systems 10 may facilitate interactions between provider entities 6 and recipient entities 4 by communicating with the entity computer systems 20, the digital resource systems 30, the third-party systems 40, and/or other systems through the network 2. The network 2 may be a global area network (GAN), such as the Internet, a wide area network (WAN), a local area network (LAN), or any other type of network or combination of networks. The network 2 may provide for wireline, wireless, or a combination of wireline and wireless communication between systems, services, components, and/or devices on the network 2.

As illustrated in FIG. 1, the organization systems 10 generally comprise one or more communication components 12, one or more processing components 14, and one or more memory components 16. The one or more processing components 14 are operatively coupled to the one or more communication components 12 and the one or more memory components 16. As used herein, the term "processing component" generally includes circuitry used for implementing the communication and/or logic functions of a particular system. For example, a processing component 14 may include a digital signal processor component, a microprocessor component, and various analog-to-digital converters, digital-to-analog converters, and other support circuits and/or combinations of the foregoing. Control and signal processing functions of the system are allocated between these processing components according to their respective capabilities. The one or more processing components 14 may include functionality to operate one or more software programs based on computer-readable instructions 18 thereof, which may be stored in the one or more memory components 16.

The one or more processing components 14 use the one or more communication components 12 to communicate with the network 2 and other components on the network 2, such as, but not limited to, the components of the one or more entity computer systems 20, the one or more digital resource systems 30, the one or more third-party systems 40, and/or other systems. As such, the one or more communication components 12 generally comprise a wireless transceiver, modem, server, electrical connection, electrical circuit, or other component for communicating with other components on the network 2. The one or more communication components 12 may further include an interface that accepts one or more network interface cards, ports for connection of network components, Universal Serial Bus (USB) connectors and the like.

As further illustrated in FIG. 1, the organization systems 10 comprise computer-readable instructions 18 stored in the memory component 16, which in one embodiment includes the computer-readable instructions 18 of the organization application 17 (e.g., website applications, dedicated applications, internal applications, or the like). In some embodiments, the one or more memory components 16 include one or more data stores 19 for storing data related to the organization systems 10, including, but not limited to, data created, accessed, and/or used by the organization application 17. The organization application 17 may be utilized to facilitate communications between the various systems in order to validate the recipient entity 4 and/or the associated resource pool, and determine resource delivery channel preferences, as will be described in further detail herein.

As illustrated in FIG. 1, the provider entity 6 and the recipient entity 4 may utilize the entity computer systems 20 (e.g., provider entity computer systems and recipient entity computer systems) to enter into interactions with each other. Moreover, the provider entity 6 may access the organization application 17 (e.g., one or more applications for the APIs, or other applications), through the one or more entity computer systems 20 to provide resources to the recipient entity 4. Moreover, the recipient entity 4 may utilize the entity computer systems 20 to access the resource applications 37 on the resource systems 30 in order to access a resource pool of the recipient entity 4. The one or more entity computer systems 20 may be a desktop, mobile device (e.g., laptop, smartphone device, PDA, tablet, or other mobile device), or any other type of computer that generally comprises one or more communication components 22, one or more processing components 24, and one or more memory components 26.

The one or more processing components 24 are operatively coupled to the one or more communication components 22, the one or more image capture components 25, and the one or more memory components 26. The one or more processing components 24 use the one or more communication components 22 to communicate with the network 2 and other components on the network 2, such as, but not limited to, the organization systems 10, the resource systems 30, the third-party systems 40, and/or other systems. As such, the one or more communication components 22 generally comprise a wireless transceiver, modem, server, electrical connection, or other component for communicating with other components on the network 2. The one or more communication components 22 may further include an interface that accepts one or more network interface cards, ports for connection of network components, Universal Serial Bus (USB) connectors and the like. Moreover, the one or more communication components 22 may include a keypad, keyboard, touch-screen, touchpad, microphone, mouse, joystick, other pointer component, button, soft key, and/or other input/output component(s) for communicating with the entities 4, 6.

As illustrated in FIG. 1, the one or more entity computer systems 20 may have computer-readable instructions 28 stored in the one or more memory components 26, which in one embodiment includes the computer-readable instructions 28 for one or more entity applications 27, such as dedicated applications (e.g., apps, applet, or the like), portions of dedicated applications, a web browser or other apps that allow the entities 4, 6 to take various actions, including allowing the entities to access applications located on other systems, or the like. In some embodiments, the provider entity 6 utilizes the provider entity computer systems 20 to communicate with the organization systems 10, which communicates with the digital resource systems 30 in order to validate a recipient entity 4 for an interaction with the recipient entity 4, including delivering resources to the recipient entity 4. Moreover, the provider entity 6 may utilize the provider entity computer systems 20 to communicate with the organization systems, in order to determine the delivery preferences of the recipient entity 4 in order to determine the delivery channel preferred by the recipient entity 4.

As illustrated in FIG. 1, one or more resource systems 30 (e.g., digital wallet systems 30 of one or more digital wallet providers) may communicate with the one or more organization systems 10 and/or one or more entity computer systems 20 to validate the recipient entity 4. As such, the one or more resource systems 30 are operatively coupled, via a network 2, to the one or more organization systems 10, the one or more entity computer systems 20, the one or more third-party systems 40, and/or other systems. The one or more resource systems 30 generally comprise one or more communication components 32, one or more processing components 34, and one or more memory components 36. The one or more processing components 34 are operatively coupled to the one or more communication components 32, and the one or more memory components 36. The one or more processing components 34 use the one or more communication components 32 to communicate with the network 2 and other components on the network 2, such as, but not limited to, the components of the one or more organization systems 10, the one or more entity computer systems 20, the one or more third party systems 40, and/or other systems. As such, the one or more communication components 32 generally comprise a wireless transceiver, modem, server, electrical connection, or other component for communicating with other components on the network 2. The one or more communication components 32 may further include an interface that accepts one or more network interface cards, ports for connection of network components, Universal Serial Bus (USB) connectors and the like.

As illustrated in FIG. 1, the one or more resource systems 30 may have computer-readable instructions 38 stored in the one or more memory components 36, which in one embodiment includes the computer-readable instructions 38 of resource applications 37 (e.g., digital resource application, such as digital wallet applications, or the like) that allow for the interactions between the provider entities 6, the recipient entities 4, and/or organizations, as will be described herein. The one or more resource systems 30 may be utilized to facilitate the interaction between provider entity 6 and the recipient entity 4, by allowing for the verification of the recipient entity 4 through communication with the various systems.

Moreover, as illustrated in FIG. 1, other like systems may be operatively coupled to the one or more organization systems 10, the one or more entity computer systems 20, and/or the one or more resource systems 30, and/or other like systems, through the network 2. The other like systems have components the same as or similar to the components described with respect to the one or more organization systems 10, the one or more entity computer systems 20, and/or the one or more resource systems 30 (e.g., one or more communication components, one or more processing components, and one or more memory devices with computer-readable instructions of one or more applications, one or more datastores, or the like). Thus, the other like systems communicate with the one or more organization systems 10, the one or more entity computer systems 20, the one or more resource system systems 30, and/or each other in same or similar way as previously described with respect to the one or more organization systems 10, the one or more entity computer systems 20, and/or the one or resource systems 30.

FIG. 2 illustrates a resource pool validation process 100 and FIG. 3 illustrates a resource pool validation block diagram 200, both of which relate to validating a recipient entity 4 for an interaction with a provider entity 6. As illustrated by block 110 in FIG. 2, the organization (e.g., through the organization systems 10) receives a request for an interaction between a provider entity 6 and a recipient entity 4. For example, the interaction may include delivering resources from the provider entity 6 (e.g., as held by the organization for the provider entity 6) to the recipient entity 4. The provider entity 6 and/or the recipient entity 4, a previously discussed herein, may be a business, a user, or the like. As such, in some embodiments, the provider entity 6 may be a business that is entering into an interaction with the recipient entity 4, which may be a user, to deliver resources to the user. In this way, the provider entity 6 and the recipient entity 4 may enter into the interaction using the provider entity systems and the recipient entity systems, respectively. In order to enter into the interaction, the recipient entity 4 may disclose recipient entity information to the provider entity 6. The recipient entity 4 information may include a resource pool entity (e.g., a digital wallet account entity, or other reference to the resource pool of the receiving entity without actually using a resource pool number, such as a resource pool account number), with which the recipient entity 4 has a resource pool and through which the user would like to receive resources. The recipient entity information may further include a recipient entity identifier. The identifier may be any type of identifier; however, in some embodiments the recipient entity identifier may comprise and electronic communication address (e.g., e-mail address, or the like) or a mobile device number (e.g., phone number, or the like). It should be understood that for some resource pools, and in particular digital wallet resource pools, the system may only utilize an entity's electronic communication address, and/or the recipient entity's mobile device number, in order to provide the information needed to validate the recipient entity 4 and the associated resource pool, and thereafter deliver (e.g., transfer electronically) the resources to the resource pool of the recipient entity 4. That is, a resource pool number (e.g., an account number) is not needed in order to validate the receiving entity 4.

As illustrated by the one or more APIs 210 (or portions thereof) in FIG. 3, the request for validation may be received by the organization or by a third-party through the use of the one or more APIs 210. It should be understood, that the one or more APIs 210 may be separate APIs or may be portions of a single API 210, or both. It should be further understood that the one or more APIs may be the interfaces through which the parties communicate with each other to perform the steps of the resource pool validation process 100. As illustrated in FIG. 2, the one or more APIs 210 may include a connect API 212, which provides the information needed to allow the various systems to link within the validation systems. The one or more APIs 210 may further comprise a web API 214, which allows different organizations using different technologies to communicate over the Internet through the one or more APIs 210. For example, the systems of the present invention may receive requests from various provider entities 6, all of which may have different systems types or programming language. In this way, the web API 214 may allow for the receipt of requests and information regardless of the types of systems from which the requests are made. The one or more APIs 210 may further comprises a mobile API 216, which allows for the receipt of the requests and the receiving entity information through the use mobile devices.

In other embodiments, there may be additional APIs as needed. It should be understood that the one or more APIs 210 allow for the communication between the various systems described herein in a simplified way for all of the entities and organizations regardless of the differences in the systems used by the entities and organizations. Moreover, the one or more APIs 210 (or a portion thereof) may be stored and/or controlled by the organization through the organization systems 10, or the one or more APIs 210 (or a portion thereof) may be stored and/or controlled by a third-party through the third-party systems 40. As such, the validation systems may be a part of the one or more organization systems 10 or may be operated by a third-party system 40 in order to be a universal system for all of the organizations and/or entities.

Block 120 of FIG. 2 illustrates that a determination is made if the validation for the recipient entity is stored and is still active. In some embodiments of the invention, as will be discussed with respect to block 150, each time a recipient entity 4 and associated resource pool are validated, the recipient entity information and an indication that the recipient entity has been validated may be stored (e.g., by the organization systems 10, the third-party systems 40, or the like). Validation conditions may also be stored along with the validation. One example of a validation conditions may include a validation time period, which is the time period for which the validation is active. The validation time period may last for a period of hours, days, weeks, months, or the like. As such, when a request for an interaction is received, the system may be able to access a database to determine if the recipient entity has already been validated and that the validation is still active (e.g., it was performed within the desired validation time period). It should be understood that in addition to the validation time period, other validation conditions may have to be met in order to validate the receiving entity 4 through the validation database. Some of the other validation conditions may include an interaction amount (e.g., if the amount is greater than a validation threshold amount additional validation may be required), an interaction location (e.g., the location of the providing entity 6 or receiving entity 4), an entity type (e.g., type of providing entity 6 or receiving entity), or other like validation conditions which if met may require a new validation even when a previous validation has been stored.

As illustrated in FIG. 3, a validation processing engine 220 may be utilized to access the validation database 260 in order to determine if the recipient entity 4 has already been previously validated, and if the interaction meets any validation conditions. In some embodiments of the invention, the recipient entity information that is included in the request may be compared with the stored recipient entity information in the validation database 260 to determine if the recipient has been previously validated and such validation is still active. It should be understood that in order to determine whether or not the recipient entity 4 may have been previously validated, the validation processing engine may only need a portion of the recipient entity information. For example, the recipient entity information needed to execute a validation, such as recipient entity identifier, resource pool entity, recipient entity name, or the like, as will be described in further detail later with respect to block 140 may be more than what is needed to identify if the recipient entity 4 has been previously validated. For example, only the recipient entity identifier (e.g., e-mail address and/or phone number) may be needed to determine if the recipient entity 4 is stored in the validation database 260. For example, if the recipient entity identifier meets a stored recipient entity identifier and there is only one resource pool associated with the recipient entity, then the recipient entity may be validated without having to access the resource systems 30 and/or without having to contact the recipient entity 4 and/or the provider entity 6 for additional recipient entity information. That is, the other recipient entity information stored in the validation database may be captured to ultimately deliver the resources. Alternatively, if there are multiple resource pools associated with the recipient entity stored in the database, additional recipient entity information (e.g., the resource pool entity and/or resource pool involved in the interaction) may be required in order to identify the proper stored validation of the recipient entity 4 and associated resource pool, and/or complete the interaction.

As illustrated by block 130 in FIG. 3, when the recipient entity 4 has not been previously validated, the validation is no longer active (e.g., past the validation time period), or the validation conditions are not met, a new validation may be required. Therefore, a determination may be made if the recipient entity information received in the request is enough to validate the recipient entity 4 (e.g., validate the recipient entity 4 and/or resource pool for the first time, or provide am updated or new validation for the previously validated recipient entity 4). If the recipient entity information received is not enough to validate the recipient entity 4, then the organization may communicate with the provider entity 6 and/or the recipient entity 4 in order to receive the recipient entity information needed to validate the recipient entity 4. If the recipient entity information is needed to validate has already been received then the process may move to executing validation.

The validation processing entity 220 may access validation requirements 230 in order to determine the recipient entity information needed to validate the recipient entity 4. Depending on the third-party that is responsible for the resources systems 30 that hold the resource pool of the receiving entity 4, each third-party may have different validation requirements. As such, the validation processing engine 220 may determine if the information received in the validation request, or in subsequent communications, is enough to validate the receiving entity 4 through the resource systems 30 based on the validation requirements for each third-party. For example, different resource systems 30 operated by different third-parties (e.g., different third-parties operating different digital wallet systems), may require only the electronic communication address, only the mobile device number, both the electronic communication address and mobile device number, and/or combinations of other recipient information (e.g., entity name, mailing address, or the like).

Block 140 of FIG. 2 illustrates that validation is executed after it is determined that the necessary validation requirements have been received. In one embodiment, validation may be executed by sending a ping to the resource systems 30 of the resource pool entity (e.g., third-party digital wallet providers). The ping may comprise sending the recipient entity information, such as the recipient entity identifier (e.g., e-mail address, phone number, or other identifier) to the resource pool entity received from the validation request (or captured from the validation database in the event the system is validating a receiving entity for which a stored validation has expired or did not meet validation conditions). In response the resource systems 30 send back a ping indicating whether or not the entity information, and in particular, the recipient entity identifier corresponds with a resource pool in the resource systems 30. In other embodiments of the invention, the ping response may include additional information, such as for example, all of the resource pools associated with the recipient entity information. For example, if the recipient entity's name, e-mail address, phone number, or the like is associated with one resource pool, the recipient entity 4 is validated. If there is only one resource pool associated with the recipient entity 4, the process may move to delivering the resources to complete the interaction. Alternatively, if a plurality of resource pools are associated with the recipient entity 4, further communication with the receiving entity 4 and/or provider entity 6 may be required in order to identify the desired resource pool from the two or more resources pools.

As illustrated in FIG. 3, the validation processing engine 220 accesses the account validation execution 250 in order to validate the recipient entity 4 through communication with the resource systems 30 (e.g., to ping the resource systems 30 and receive a ping response). For example, the validation execution 250 calls to the one or more digital wallet APIs in order to provide the recipient entity information (e.g., recipient entity identifier, and/or other information). In response, the resource systems 30 determine if there is a digital wallet resource pool associated with the recipient entity information. In some embodiments, the resource systems 30 utilize the recipient entity's name and identification number (e.g., e-mail address and/or phone number), and compares this recipient information to stored recipient information. When the resource systems 30 determine there is a match, the resource systems 30 provide a notification to the organization (e.g., financial institution or third-party at which the resources of the provider entity 6 are stored) that the receiving entity 4 has a resource pool (e.g., digital wallet account) with the resource entity (e.g., digital wallet third-party).

Block 150 of FIG. 2 illustrates that after the resource entity 4 validates the recipient entity 4, the validation of the recipient entity 4 may be stored for future use. For example, the recipient entity's name, the recipient entity identifier, the resource entity with which the recipient entity has a resource pool, and/or other recipient entity information is stored for future validation. In some embodiments a validation time period may also be stored to indicate the length of time for which the validation remains active. Other validation requirements may also be set, such as allowing validation for the entity based on the interaction resource amount, the providing entity 6, the organization storing the resources, the type of interaction (e.g., goods or services being provided), or the like associated with each interaction. The validation of the recipient entity 4, validation time period, and other validation conditions may be set by an entity (e.g., recipient entity, provider entity, or the like), organization, third-party, or the like, and stored by one or more of these same entities for future validation of a recipient entity 4 without having to access the resource systems 30 each time the resources are delivered.

As illustrated in FIG. 3, the validation and validation conditions may be stored in the validation database 260, such that upon future requests to validate the recipient entity 4 the validation processing engine 220 need only access the validation database 260 in order to determine if the recipient entity 4 has been previously validated and such validation is still active and/or meets the other validation requirements. Moreover, as illustrated in FIG. 3 when taking various actions the validation processing engine 220 may access entitlement requirements 240 in order to determine if the parties involved in the validation request have authorization to access the validation systems and services described herein.

Block 160 of FIG. 2 further illustrates that the interaction is completed after validation has been confirmed (e.g., validation from the stored database and/or validation from the pinging the resource systems 30). That is, automatically after validation, or upon final approval by the providing entity 6, the organization transfers the resources from the provider entity resource pool (e.g., provider account with the organization) to the recipient entity resource pool (e.g., digital wallet account).

In some embodiments, it should be understood that the provider entity 6 may be a customer of the organization. The organization may be a financial institution, digital wallet organization, or any other organization through which the provider entity 6 has a resource pool (e.g., a type of account, such as a credit or debit account, that has associated funds available). The recipient entity 4 may be a user that is receiving resources for the provider entity 6, and the recipient entity 4 may have a resource pool (e.g., digital wallet account) that is stored by a third-party that is responsible for the resource systems 30 that manages the resource pool of the recipient entity 4.

It should be understood that the embodiments of the invention described with respect to FIGS. 2 and 3 provide improved processing capacity, improved memory, and improved processing speeds. In typical interactions, in order for the provider entity 6 to transfer resources to the resource pool of a receiving entity 4, the organization associated with the provider entity 6 (e.g., organization responsible for the resource pool of the provider entity) makes small resource validation interactions (e.g., small transactions of cents, or the like) with the resource pools associated with the receiving entity 4. In order to make the small transactions, resource pool numbers (e.g., account numbers) are needed on both sides of the interactions in order to make the small resource transfers (e.g., deposits and withdrawals). These types of interactions require processing capacity to enter the interactions (e.g., make the deposits and withdrawals), additional memory in order store the resource pool and entity information on both sides of the interactions (e.g., store the account numbers and make the transfers), and increased processing times in order to make and confirm the interactions (e.g., takes days to settle and post the accounts). In the embodiments of the invention described herein, since the interaction is a payment to a resource pool of the recipient entity 4, and does not include a withdrawal from the resource pool of the recipient entity 4, the interactions can be greatly simplified. As described herein, only certain recipient entity information may be needed to validate the recipient entity and/or the associated resource pool. That is, only the recipient entity identifier, the recipient entity name, and/or the resource pool entity (e.g., third-party entity servicing the digital wallet) is needed in order to ping the resource pool entity and verify the recipient entity 4 or access the stored verification of the recipient entity 4. As such, the processing capacity is improved because only a single ping is needed to validate the recipient entity 4 or only a centralized location for storing the validation information is needed (as opposed to each entity, organization, and/or third-party storing such information). Moreover, the memory is improved because all of the resource pool numbers and associated information for the parties does not need to be stored and/or accessed for each interaction. Additionally, processing speeds are greatly improved because the parties do not have to wait for the small resource validation interactions to post and settle (e.g., post and settle the deposits and withdrawals) before the resources for the interactions are provided.

In addition to validating the recipient entity 4, embodiments of the invention may also include determining if and when an original delivery channel should or can be substituted by an alternate delivery channel. FIG. 4 illustrates a resource delivery preference and distribution process 300, while FIG. 5 illustrates a resource delivery block diagram 400. As illustrated by block 310 in FIG. 4, a delivery preference request is received for an interaction between a provider entity 6 and a recipient entity 4. In some embodiments of the invention, the delivery preference request may include recipient entity information, as previously discussed herein. The recipient entity information may be utilized in order to determine the recipient entity preference for receiving the resources. For example, it should be understood that the organization may receive a request from the provider entity 6 to provide resources to the receiving entity 4. As illustrated in FIG. 5, the one or more APIs, such as the connect API, web API, mobile API, or other API, may be utilized to receive the request from the provider entity 6. It should be understood the delivery request may be received in the same or similar way as was described with the respect to the validation request described in FIGS. 2 and 3.

Block 320 of FIG. 4 illustrates that an original delivery channel for the interaction between the provider entity 6 and the recipient entity 4 is identified. That is, the provider entity 6 may include in the delivery preference request an original delivery channel for typical interactions in which the provider entity 6 is involved. In other embodiments, the organization may determine the original delivery channel from the past interactions that the provider entity 6 entered with the recipient entities 4. The original delivery channel in some typical embodiments may be a physical resource transfer (e.g., paper checks, or other like physical resource transfers).

FIG. 4 further illustrates in block 330 that a delivery preference database 460 is accessed in order to determine if a recipient delivery preference for delivery channel for the receiving entity is stored. The delivery preference request may include the recipient entity information, as previously discussed herein. In some embodiments, recipient entity information, such as the recipient entity identifier, the recipient entity name, address, or the like), may be utilized in order to determine if a delivery preference for the recipient entity 4 is stored in the delivery preference database 460. In addition to the recipient entity information, the delivery preference request previously discussed may further include interaction information (e.g., amount of resource, entities involved, associated products or services, or the like). In some embodiments, the delivery preference database 460 may also include delivery conditions associated with different recipient delivery preferences. As such, in some embodiments, the interaction information may be compared to the delivery conditions in order to determine which delivery preference is applicable to a particular interaction. As illustrated in FIG. 5, a resource delivery processing engine 420, like the validation processing engine 220 previously discussed herein, may access the preference database 460 in order to identify a recipient delivery preference stored for the recipient entity 4.

As illustrated by block 340 in FIG. 4, when the recipient delivery preference is not stored in the delivery preference database, a notification may be sent to the recipient entity 4 in order to determine the recipient entity delivery preference. For example, a communication is sent (e.g., e-mail, phone call, text message, or other message) to the recipient entity 4 requesting that the recipient entity 4 provide a delivery preference. In some embodiments, the communication may be an inquiry asking if the recipient entity 4 would receive an alternate delivery channel for resources that are typically sent by the original delivery channel. For example, the notification may ask if the recipient entity 4 would like to substitute an alternate delivery channel for the original delivery channel. In some embodiments the notification may suggest the alternate channel, while in other embodiments the notification may request the recipient entity 4 to provide a preferred delivery channel. In some embodiments, the suggested delivery channel may be a suggestion to utilize a particular resource pool (e.g., a digital wallet account) in order to receive the resources. The suggestion of a particular resource pool, such as a digital wallet, may be suggested because of the benefits that this type of resource pool may have over other resource pools. For example, using the recipient entity identifier to provide the resource results in improved processing capacity, reduction in memory required, and improved processing speeds, as well as improved security (e.g., more confidence in the identity of the recipient entity 4), which all were previously discussed herein. As illustrated in FIG. 5, the resource delivery processing engine 420 may send the notification by communicating with the recipient entity computer systems.

FIG. 4 further illustrates in block 350 that a delivery preference is received from the recipient entity 4. In some embodiments the delivery preference may be an acceptance of the suggested alternate delivery channel. In other embodiments the delivery preference may be an alternate delivery channel that is selected by the recipient entity 4 from options presented to the recipient entity. In other embodiments, the delivery preference may be an alternate delivery channel that was not previously presented to the recipient entity 4 as an option. As illustrated in FIG. 5, the resource delivery process engine 420 may receive the delivery preference from the recipient entity systems.

It should be understood that with respect to blocks 320, 330, 340, and 350 before the original delivery channel is identified, before the delivery preference database is accessed, and/or before or after the notification is sent to the recipient entity requesting the recipient delivery preference, the resource delivery processing engine 420 may access the delivery requirements 430 in order to determine if the delivery processing engine 420 has the recipient entity information necessary in order to determine the recipient delivery preference. The recipient entity information may be the same information as previous described herein (e.g., recipient name, identifier, delivery channel options, address, or the like).

Block 360 of FIG. 4 further illustrates that after a delivery preference is determined from a delivery preference database 460 or is received from the recipient entity 4, a notification may be sent to the providing entity 6 and/or the organization to indicate the delivery preference of the recipient entity 4. The providing entity 6 and/or the organization use the indication of the delivery preference of the recipient entity 4 to continue processing the resources.

Block 370 further illustrates that resources may be delivered according to the original delivery channel. For example, when the recipient delivery preference of the recipient entity 4 is the same as the original delivery channel, the resource delivery is processed according to the original delivery channel. In some embodiments, this may be a physical resource transfer (e.g., paper checks, or other like physical resource transfers). However, in some embodiments the original delivery channel may be any other channel through which the resources may be provided to the recipient entity, such as a push to a card account, an account deposit, a balance payoff, or the like.

FIG. 4 further illustrates in block 380, that when the recipient entity 4 provides an alternate delivery channel or an alternate delivery channel is identified from the preference database 460, the resources are delivered according to the alternate delivery channel. In some embodiments, the alternate delivery channel may include a resource pool of the recipient entity 4 stored on the resource systems 30 (e.g., digital wallet channel). In some embodiments, in order for the provider entity 6 to deliver the resources to the recipient entity through the resource systems 30, the recipient entity 4 must first be validated, in accordance with the validation process 100 described with respect to FIGS. 2 and 3. That is, the validation of the recipient entity 4 may occur by accessing the validation database 260 and/or by using the recipient entity information (e.g., recipient entity identifier) in order to ping a resources system 30 to determine if the recipient entity 4 and/or the associated resource pool is valid.

Block 390 of FIG. 4, further illustrates that the interaction is completed when the organization delivers the resources from the provider entity resource pool to the recipient entity 4 according to the recipient entity delivery preference. With respect to delivery of the resources to the resource pool of the recipient entity located on the resource systems 30, the delivery may be made as described with respect to block 160 in FIG. 2.

Moreover, as illustrated in FIG. 5 when taking various actions regarding the delivery preference the resource delivery processing engine 420 may access entitlement requirements 440 in order to determine if the parties involved in the delivery preference request have authorization to access the systems and services described herein.

It should be understood that the embodiments of the invention described with respect to FIGS. 4 and 5 provide improved processing capacity, improved memory, and improved processing speeds. In typical interactions, such as when a paper check or other physical document is utilized in order for the provider entity 6 to transfer resources to the receiving entity 4, the provider entity 6, third-party entity (e.g., clearinghouse, payee financial institutions, or the like) and/or organizations associated with the provider entity 6 (e.g., organization responsible for the resource pool of the provider entity 6) must process the paper check according to traditional processing methods that require reading the check images or data from the check and processing the interactions using the traditional physical instrument processing rails (e.g., check processing rails), such as clearinghouse rails. These types of interactions require processing capacity to enter the interactions (e.g., handling the capture and storage of the information from the physical instrument), additional memory in order store the resource pool and entity information on both sides of the interaction (e.g., store the account numbers and make the transfers), and increased processing times in order to make and confirm the interactions (e.g., takes days to settle and post the physical resource documents). In the embodiments of the invention described herein, by replacing the original delivery channel (e.g., a paper or other physical instrument), and/or by utilizing a preference for an alternative delivery channel, such as a digital wallet resource pool, the processing capacity is improved because validation information may be stored, captured, and used more efficiently (e.g., stored in a uniform database that multiple organizations can access, or use a single ping to validate the recipient entity 4). Moreover, memory is improved because all of the resource pool numbers and associated information for the parties and physical instruments do not need to be stored and/or accessed for each interaction. Additionally, processing speeds are greatly improved because the parties do not have to wait for the physical instruments to be processed before the resources for the interactions are provided.

As described briefly above, the one or more APIs allow for a centralized location for the entities and/or organization to access in order to carry out the processes described herein. That is, the present invention provides a single location that the provider entity may access in order to validate a recipient entity and/or determine a delivery preference for the recipient entity. This central location (e.g., including the potential central location for the validation database or recipient preference database) allows the providing entity to access a single interface location, while the organization and/or a third-party that controls the interface does the work in reaching out to the resource systems, the third-parties, and/or recipient entities in order to validate and/or determine a delivery preference of the recipient entity. In this way, the providing entity does not have to access the various resource systems, the third-parties, and/or the recipient entities each time the providing entity enters into an interaction with a recipient entity and/or transfers resources to the recipient entity. Since the organizations and/or third-parties are more regularly handling the resource transfers controlling the validation and/or delivery preference from a centralized location (e.g., including centralized databases) this improves processing times, reduces memory requirements, and increases the processing capacity of the providing entities, the organizations, the resource entities, and/or third-parties. That is, for example, the parties involved do not each have to store redundant information for validation and/or delivery preferences of each of the resource entities. For example, a first providing entity and a second providing entity do not have to store the same information (e.g., in two validation databases and/or delivery preference databases), and instead a centralized location is used to store all the information. Additionally, the present inventions expands the access to stored validations and/or delivery preferences of recipient entities to which a single provider entity might not otherwise have (e.g., all of the information stored for each recipient entity of various organizations and/or providing entities is aggregated in a single location and/or accessing through a single location).

It should be understood, that the systems described herein may be configured to establish a communication link (e.g., electronic link, or the like) with each other in order to accomplish the steps of the processes described herein. The link may be an internal link within the same entity (e.g., within the same financial institution) or a link with the other entity systems. In some embodiments, the one or more systems may be configured for selectively monitoring the resource usage and availability. These feeds of resource usage and availability may be provided via wireless network path portions through the Internet. When the systems are not providing data, transforming data, transmitting the data, and/or creating the reports, the systems need not be transmitting data over the Internet, although it could be. The systems and associated data for each of the systems may be made continuously available, however, continuously available does not necessarily mean that the systems actually continuously generate data, but that a systems are continuously available to perform actions associated with the systems in real-time (i.e., within a few seconds, or the like) of receiving a request for it. In any case, the systems are continuously available to perform actions with respect to the data, in some cases in digitized data in Internet Protocol (IP) packet format. In response to continuously monitoring the real-time data feeds from the various systems, the systems may be configured to update activities associated with the systems, as described herein.

Moreover, it should be understood that the process flows described herein include transforming the data from the different systems (e.g., internally or externally) from the data format of the various systems to a data format associated with one or more displays. There are many ways in which data is converted within the computer environment. This may be seamless, as in the case of upgrading to a newer version of a computer program. Alternatively, the conversion may require processing by the use of a special conversion program, or it may involve a complex process of going through intermediary stages, or involving complex "exporting" and "importing" procedures, which may convert to and from a tab-delimited or comma-separated text file. In some cases, a program may recognize several data file formats at the data input stage and then is also capable of storing the output data in a number of different formats. Such a program may be used to convert a file format. If the source format or target format is not recognized, then at times a third program may be available which permits the conversion to an intermediate format, which can then be reformatted.

As will be appreciated by one of skill in the art in view of this disclosure, embodiments of the invention may be embodied as an apparatus (e.g., a system, computer program product, and/or other device), a method, or a combination of the foregoing. Accordingly, embodiments of the invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the invention may take the form of a computer program product comprising a computer-usable storage medium having computer-usable program code/computer-readable instructions embodied in the medium (e.g., a non-transitory medium, or the like).

Any suitable computer-usable or computer-readable medium may be utilized. The computer usable or computer readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires; a tangible medium such as a portable computer diskette, a hard disk, a random access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the invention may be written in an object oriented, scripted or unscripted programming language such as Java, Pearl, Python, Smalltalk, C++ or the like. However, the computer program code/computer-readable instructions for carrying out operations of the invention may also be written in conventional procedural programming languages, such as the "C" programming language or similar programming languages.

Embodiments of the invention described above, with reference to flowchart illustrations and/or block diagrams of methods or apparatuses (the term "apparatus" including systems and computer program products), will be understood to include that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

Specific embodiments of the invention are described herein. Many modifications and other embodiments of the invention set forth herein will come to mind to one skilled in the art to which the invention pertains, having the benefit of the teachings presented in the foregoing descriptions and the associated drawings. Therefore, it is to be understood that the invention is not to be limited to the specific embodiments disclosed and that modifications and other embodiments and combinations of embodiments are intended to be included within the scope of the appended claims. Although specific terms are employed herein, they are used in a generic and descriptive sense only and not for purposes of limitation.

INCORPORATION BY REFERENCE

To supplement the present disclosure, this application further incorporates entirely by reference the following commonly assigned patent applications:

| U.S. patent application Ser. No. | Title | Filed On |
|---|---|---|
| 15/730,573 | ENTITY RESOURCE DISTRIBUTION CHANNEL MANIPULATION | Concurrently herewith |

What is claimed is:

1. A system for validating entities for interactions, the system comprising:
   one or more memory components having computer readable code stored thereon; and
   one or more processing components operatively coupled to the one or more memory components, wherein the one or more processing components are configured to execute the computer readable code to:
      receive a request from a provider entity through one or more application programming interfaces (APIs) for an interaction with a recipient entity, wherein the interaction with the recipient entity includes at least delivering resources to a resource pool of the recipient entity, wherein the resources are funds and the resource pool of the recipient entity is an account of the recipient entity, wherein the request includes recipient entity information comprising at least a recipient entity identifier, wherein the request is received through a provider entity computer system;

validate the recipient entity using the recipient entity information, including at least the recipient entity identifier, wherein validating the recipient entity comprises pinging a resource system to determine existence of the resource pool for the recipient entity identifier without having to utilize resource validation interactions, wherein the resource validation interactions comprise transactions of resource amounts that require a resource pool number for the resource pool of the recipient entity; and deliver the resources to the resource pool of the recipient entity when the recipient entity is validated, wherein the resources are delivered by communicating with the resource system.

2. The system of claim 1, wherein validate the recipient entity comprises:

communicate at least the recipient entity identifier to the resource system; and receive a validation response from the resource system, wherein the validation response comprises:

a validation confirmation that the recipient entity is validated when the resource pool of the recipient entity is identified within the resource system; and an indication of multiple resource pools when two or more recipient entities or two or more resource pools for the recipient entity are identified.

3. The system of claim 2, wherein in response to receiving the validation confirmation delivering the resources to the resource pool of the recipient entity; and wherein in response to receiving the indication of multiple resource pools the one or more processing components are further configured to execute the computer readable code to:

send an information request to the provider entity or the recipient entity, wherein the information request comprises a request for a selection of one of the multiple resource pools to deliver the resources, and wherein the information request is sent to the provider entity computer system or a recipient entity computer system.

4. The system of claim 1, wherein validating the recipient entity comprises:

accessing a validation database, wherein the validation database comprises stored validations for a plurality of recipient entities comprising stored recipient entity information;

comparing the recipient entity information with the stored recipient entity information;

determining that the recipient entity information meets one or more validation conditions, wherein the one or more validation conditions comprise at least one validation of the recipient entity within a past time period;

validate the recipient entity when the recipient entity information meets the stored recipient entity information and the one or more validation conditions are met, including at least a validation of the recipient entity within the past time period; and communicating at least the recipient entity information to the resource system when the recipient entity information does not meet the stored recipient entity information or the past time period.

5. The system of claim 4, wherein the validation database is stored by a third-party system.

6. The system of claim 1, wherein the recipient entity identifier comprises an electronic communication address or a mobile device number of the recipient entity, and the validation occurs without utilizing resource pool number of the recipient entity.

7. The system of claim 1, wherein the recipient entity information further comprises a resource pool entity of the recipient entity, wherein the resource pool entity comprises a holder of a digital wallet of the recipient entity.

8. The system of claim 1, wherein the recipient entity information further comprises a name of the recipient entity.

9. The system of claim 1, wherein the provider entity receives the recipient entity information from the recipient entity when entering the interaction with the recipient entity.

10. The system of claim 1, wherein the recipient entity information further comprises a resource pool entity of the recipient entity, wherein the resource pool entity comprises a holder of a digital wallet of the recipient entity.

11. A computer implemented method for validating entities for interactions, the method comprising:

receiving, by one or more processing components, a request from a provider entity through one or more application programming interfaces (APIs) for an interaction with a recipient entity, wherein the interaction with the recipient entity includes at least delivering resources to a resource pool of the recipient entity, wherein the resources are funds and the resource pool of the recipient entity is an account of the recipient entity, wherein the request includes recipient entity information comprising at least a recipient entity identifier, wherein the request is received through a provider entity computer system;

validating, by the one or more processing components, the recipient entity using the recipient entity information, including at least the recipient entity identifier, wherein validating the recipient entity comprises pinging a resource system to determine existence of the resource pool for the recipient entity identifier without having to utilize resource validation interactions, wherein the resource validation interactions comprise transactions of resource amounts that require a resource pool number for the resource pool of the recipient entity; and delivering, by the one or more processing components, the resources to the resource pool of the recipient entity when the recipient entity is validated, wherein the resources are delivered by communicating with the resource system.

12. The computer implemented method of claim 11, wherein validating the recipient entity comprises:

communicating at least the recipient entity identifier to the resource system; and receive a validation response from the resource system, wherein the validation response comprises:

a validation confirmation that the recipient entity is validated when the resource pool of the recipient entity is identified within the resource system; and an indication of multiple resource pools when two or more recipient entities or two or more resource pools for the recipient entity are identified.

13. The computer implemented method of claim 12, wherein in response to receiving the validation confirmation, delivering the resources to the resource pool of the recipient entity; and wherein in response to receiving the indication of multiple resource pools, the method further comprises:

sending an information request to the provider entity or the recipient entity, wherein the information request comprises a request for a selection of one of the multiple resource pools to deliver the resources, and wherein the information request is sent to the provider entity computer system or a recipient entity computer system.

14. The computer implemented method of claim 11, wherein validating the recipient entity comprises:
   accessing a validation database, wherein the validation database comprises stored validations for a plurality of recipient entities comprising stored recipient entity information;
   comparing the recipient entity information with the stored recipient entity information;
   determining that the recipient entity information meets one or more validation conditions, wherein the one or more validation conditions comprise at least one validation of the recipient entity within a past time period;
   validate the recipient entity when the recipient entity information meets the stored recipient entity information and the one or more validation conditions are met, including at least a validation of the recipient entity within the past time period; and
   communicating at least the recipient entity information to the resource system when the recipient entity information does not meet the stored recipient entity information or the past time period.

15. The computer implemented method of claim 11, wherein the recipient entity identifier comprises an electronic communication address or a mobile device number of the recipient entity, and the validation occurs without utilizing resource pool number of the recipient entity.

16. A computer program product for validating entities for interactions, the computer program product comprising at least one non-transitory computer-readable medium having computer-readable program code portions embodied therein, the computer-readable program code portions comprising:
   an executable portion configured to receive a request from a provider entity through one or more application programming interfaces (APIs) for an interaction with a recipient entity, wherein the interaction with the recipient entity includes at least delivering resources to a resource pool of the recipient entity, wherein the resources are funds and the resource pool of the recipient entity is an account of the recipient entity, wherein the request includes recipient entity information comprising at least a recipient entity identifier, wherein the request is received through a provider entity computer system;
   an executable portion configured to validate the recipient entity using the recipient entity information, including at least the recipient entity identifier, wherein validating the recipient entity comprises pinging a resource system to determine existence of the resource pool for the recipient entity identifier without having to utilize resource validation interactions, wherein the resource validation interactions comprise transactions of resource amounts that require a resource pool number for the resource pool of the recipient entity; and
   an executable portion configured to deliver the resources to the resource pool of the recipient entity when the recipient entity is validated, wherein the resources are delivered by communicating with the resource system.

* * * * *